United States Patent
Muthiah et al.

(10) Patent No.: US 11,294,579 B2
(45) Date of Patent: Apr. 5, 2022

(54) MODE HANDLING IN MULTI-PROTOCOL DEVICES

(71) Applicant: WESTERN DIGITAL TECHNOLOGIES, INC., San Jose, CA (US)

(72) Inventors: Ramanathan Muthiah, Karnataka (IN); Hitesh Golechchha, Karnataka (IN); Dinesh Kumar Agarwal, Karnataka (IN)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 16 days.

(21) Appl. No.: 16/905,387

(22) Filed: Jun. 18, 2020

(65) Prior Publication Data

US 2021/0397352 A1 Dec. 23, 2021

(51) Int. Cl.
*G06F 3/06* (2006.01)

(52) U.S. Cl.
CPC .......... *G06F 3/0619* (2013.01); *G06F 3/0634* (2013.01); *G06F 3/0646* (2013.01); *G06F 3/0679* (2013.01)

(58) Field of Classification Search
CPC .... G06F 3/0619; G06F 3/0679; G06F 3/0646; G06F 3/0634
See application file for complete search history.

(56) References Cited

U.S. PATENT DOCUMENTS

| | | | |
|---|---|---|---|
| 7,299,314 B2 | 11/2007 | Lin et al. | |
| 7,987,308 B2 | 7/2011 | Jo et al. | |
| 8,533,562 B2 | 9/2013 | Mee et al. | |
| 9,582,358 B2 | 2/2017 | Agarwal et al. | |
| 9,886,457 B2 | 2/2018 | David et al. | |
| 2008/0168252 A1* | 7/2008 | Kunimune | G06F 12/0246 711/173 |
| 2013/0080687 A1* | 3/2013 | Nemazie | G06F 12/0246 711/103 |
| 2019/0187928 A1 | 6/2019 | Agarwal | |
| 2020/0233818 A1* | 7/2020 | Hsieh | G06F 13/1668 |

FOREIGN PATENT DOCUMENTS

WO 2018225327 A1 12/2018

* cited by examiner

*Primary Examiner* — David Yi
*Assistant Examiner* — Dustin B. Fulford
(74) *Attorney, Agent, or Firm* — Arentfox Schiff LLP

(57) ABSTRACT

Aspects of a multi-protocol storage device including a controller are provided which handle mode switches after a shutdown resulting in a large amount of unfinished work by phasing the work during and after initialization. The controller operates in a first mode such as an SD mode and a second mode such as a NVMe mode. In the event of a shutdown in the second mode resulting in unfinished work, the controller initializes in the first mode. During initialization, the controller determines whether a completion time for the unfinished work exceeds an initialization time in the first mode. When the completion time exceeds the initialization time, the controller performs a first portion of the work during initialization and postpones performance of at least a second portion of the unfinished work until after initialization. As a result, initialization timeouts in the first mode due to the unfinished work may be avoided.

20 Claims, 6 Drawing Sheets

MODE HANDLING IN MULTI-PROTOCOL DEVICES

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

Flash storage devices may interface with a host using different protocols, including Non-Volatile Memory Express (NVMe) and Secure Digital (SD). For example, flash storage devices operating under the NVMe protocol (i.e. NVMe devices) may communicate with the host using a PCI express (PCIe) bus, while flash storage devices operating under the SD protocol (i.e. SD cards) may communicate with the host using a SD interface, e.g. a High Speed or an Ultra High Speed (UHS) bus. Moreover, some flash storage devices may operate under multiple protocols (i.e. multi-protocol devices). For example, SD Express cards are multi-protocol devices which may interface with the host using the PCIe express bus when operating under the NVMe protocol (in an NVMe mode), and using the SD interface when operating under the SD protocol (in an SD mode).

When a flash storage device initializes after a power cycle, the initialization latency of the device may vary depending on the state of firmware prior to the power cycle. For example, prior to a power cycle, a controller of the flash storage device may be in the process of updating control tables in flash memory (e.g. performing a master table dump). If the flash storage device experiences a graceful shutdown (GSD) following a power off command, the controller may complete updating the control tables in flash memory before powering down, and thus the device may be in a stable state and have minimal initialization latency after powering back on. However, if the flash storage device experiences an ungraceful shutdown (UGSD) following a power interrupt, the controller may not have finished updating the control tables before powering down, and thus the device may have more initialization latency to re-update (e.g. replay) the control tables after powering back on. In addition to interrupted master table dumps with long replay (or journaling) times, write aborts and flash program failures are other example situations that may result in high initialization latencies. For example, following a write abort or flash program failure resulting in an UGSD, the controller may perform data relocation from the failed block, re-build or re-calculate parity data, scan for updates to re-update control tables, and/or perform other operations during initialization after power on.

While such variable initialization latencies may be manageable for devices operating under protocols with longer initialization timeouts (e.g. NVMe), these latencies may be problematic for devices operating under protocols with stricter or shorter initialization timeouts (e.g. SD). For example, multi-protocol devices that experience UGSD in NVMe mode but power on in SD mode may not be able to re-update the control tables and perform other initialization operations before the short SD initialization timeout (e.g. within 1 second). As flash storage devices typically are not allowed to execute host commands until initialization operations are complete, the device may effectively be prevented from processing host commands in the SD mode due to initialization timeouts, impacting the performance of the storage device.

SUMMARY

One aspect of a storage device is disclosed herein. The storage device includes a controller. The controller is configured to initialize in a first mode after a shutdown during a second mode resulting in unfinished work, the unfinished work having a completion time exceeding an initialization time, to perform a first portion of the unfinished work during initialization, and to postpone performance of a second portion of the unfinished work until after the initialization.

Another aspect of a storage device is disclosed herein. The storage device includes a controller. The controller is configured to initialize in a first mode in response to a shutdown during a second mode, to determine whether a completion time for unfinished work prior to the shutdown exceeds an initialization time, and to perform a first portion of the unfinished work during the initialization and to perform at least a second portion of the unfinished work after the initialization when the completion time exceeds the initialization time.

A further aspect of a storage device is disclosed herein. The storage device includes a controller. The controller is configured to initialize in a first mode after a shutdown during a second mode, to determine whether a completion time for unfinished work prior to the shutdown exceeds an initialization time, and to postpone performance of a portion of the unfinished work until after initialization when the completion time exceeds the initialization time.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
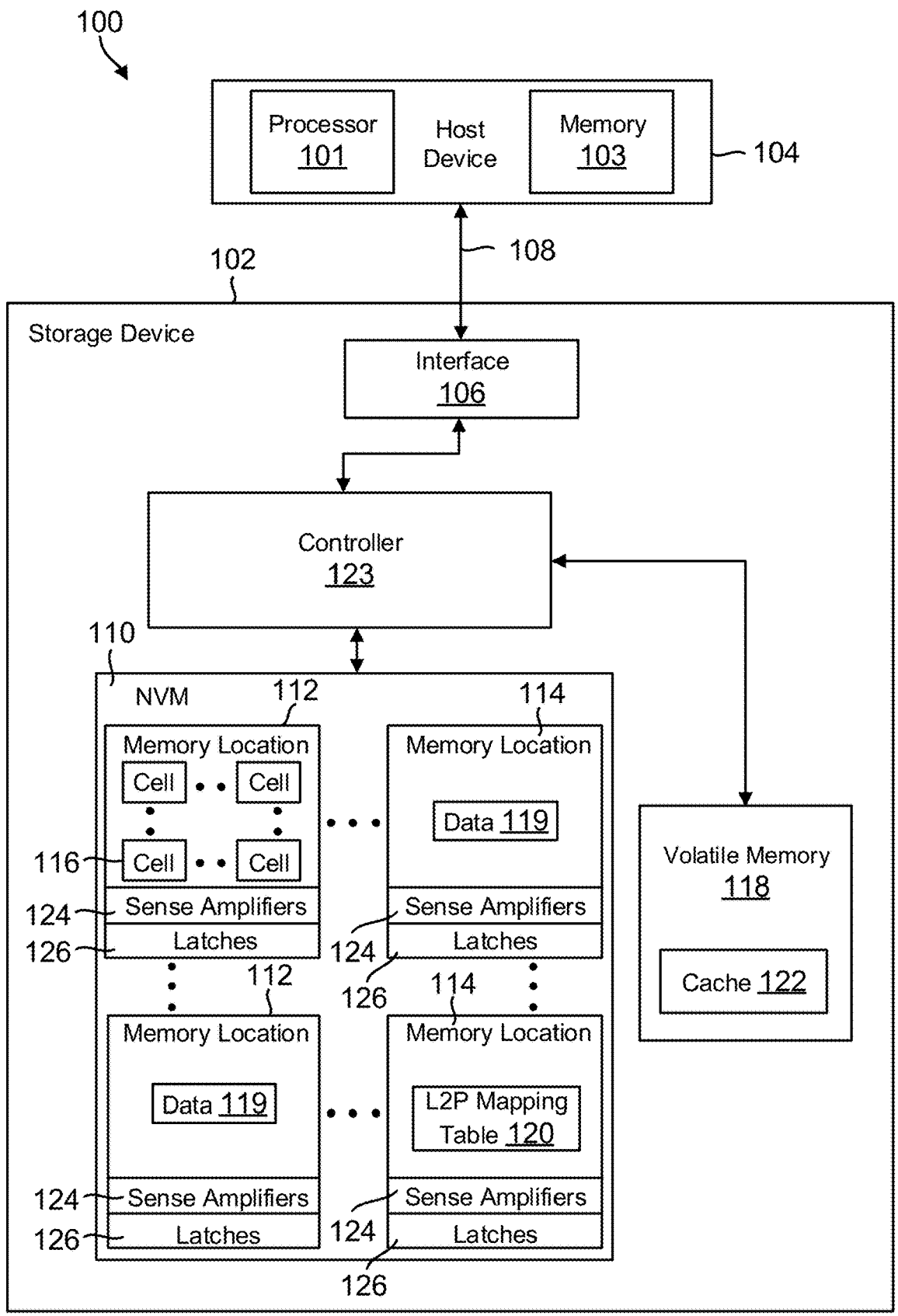
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

As used herein, the term "work" is used to mean one or more operations, processes, and/or commands that a controller of the storage device may perform or execute in addition to commands from a host device (e.g. read, write, or other host commands). Various examples of work are hereafter described. In one example, work may include a block scan for L2P consolidation (e.g. as part of journaling or replay). For instance, when performing a block scan, the controller may scan or read a journal or log (stored in blocks of flash memory) to identify previous L2P updates that were created in volatile memory but were not consolidated into an L2P table in non-volatile memory. In another example, work may include L2P consolidation subsequent to the block scan. For instance, when performing L2P consolidation, the controller may rebuild L2P mapping updates in volatile memory that were identified in the log but not stored in the L2P table, and flush the built L2P mapping updates to the non-volatile memory to be stored in the L2P table. In a further example, work may include data relocation from one or more blocks.

For instance, when performing data relocation from a first block containing both valid and invalid data, the controller may read the valid data from the first block, write the valid data to a second block, and erase the first block. In another example, work may include building or calculating parity data for correcting errors in one or more blocks. For instance, when building parity data, the controller may perform exclusive—or (XOR) operations on pages of data stored in blocks of flash memory, store the XOR results in volatile memory, and flush the XOR results to non-volatile memory. In an additional example, work may include other operations, processes, and/or commands that the controller may perform during initialization of the storage device that are known to one of ordinary skill in the art.

As used herein, the term "unfinished work" includes work that was in the process of being performed but not yet completed, by the time a shutdown (e.g. a UGSD or a GSD) occurs. Unfinished work may be restarted, or resumed, after power up of the storage device. Thus, unfinished work may include work that was not completed in one mode of a multi-protocol device (e.g. an NVMe mode), and which is restarted or continued in another mode of the multi-protocol device (e.g. an SD mode) following a mode switch. For example, unfinished work may include a block scan for L2P consolidation, L2P consolidation, data relocation, parity data calculation, and/or other operations, processes, and/or commands known to one of ordinary skill in the art that were interrupted due to a power failure or shutdown in one mode and that are restarted or resumed after a mode switch to another mode. For instance, while performing a block scan, L2P consolidation, data relocation, and/or parity data calculation in the NVMe mode, the storage device may experience an UGSD and after power on, the storage device may perform (e.g. restart or resume) the block scan, L2P consolidation, data relocation, and/or parity data calculation in the SD mode.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Generally, SD devices and NVMe devices are designed with different initialization timeouts that respectively support the initialization operations that are performed under each protocol. For example, SD devices may include smaller initialization timeouts than NVMe devices (e.g. 1 second) since SD devices typically include less memory (e.g. less die stacks) and simpler firmware capable of performing less operations than NVMe devices. In the case of multi-protocol devices that operate in both the SD and NVMe modes and that have the same form factor as an SD device, such devices may include more memory (e.g. more die stacks) and more complex firmware in order to achieve greater NVMe speeds. However, such multi-protocol devices may maintain the shorter initialization timeout criteria in the SD mode compared to the NVMe mode.

A multi-protocol device that operates in multiple modes (e.g. the SD mode and the NVMe mode) may initialize after a power cycle in either mode based on a host command or setting. Thus, if a controller of the multi-protocol device is in the process of performing work in one mode and experiences a power interrupt causing a shutdown (e.g. an UGSD), the controller may initialize after power-on in a different mode. For example, the controller may receive a command from a host device to switch from the former or old mode to the latter or new mode during initialization after powering back on. As a result, the controller may have unfinished work left over from the old mode to be handled in the new mode.

However, the time to complete the unfinished work from the old mode may be longer than the initialization timeout for the new mode. For example, if the old mode is the NVMe mode and the new mode is the SD mode, the time to complete all of the unfinished work from the NVMe mode may be longer than the initialization timeout for the SD mode. Therefore, if the controller attempts to perform this unfinished work during initialization in the SD mode after a mode switch from the NVMe mode, the device may timeout due to the shorter initialization timeout in the SD mode. As a result of the timeout, the device may be unable to process subsequent host commands.

To prevent such initialization timeouts due to large amounts of unfinished work following mode switches (e.g. from the NVMe mode to the SD mode), the controller of the storage device described in the present disclosure may perform a portion of the unfinished work during initialization and postpone performance of at least another portion of the unfinished work until after initialization. In one example, when the controller powers up in one mode (e.g. the SD mode), the controller may determine whether a shutdown resulting in unfinished work in a previous mode (e.g. the NVMe mode) has occurred. For instance, after a UGSD, the controller may receive a command from the host device to switch from the NVMe mode to the SD mode during initialization following a power on, and while in the SD mode, the controller may determine that the unfinished work during the NVMe mode was interrupted. For example, the unfinished work may include L2P consolidation, in which case the controller may identify previous logical-to-physical (L2P) updates (for blocks recently written with data in the NVMe mode) that have not been consolidated into a L2P mapping table in the flash memory. Alternatively or additionally, the controller may determine that other unfinished work than L2P consolidation that was not completed in the NVMe mode may exist. For example, while in the SD mode, the controller may determine that a write abort or a flash program failure occurred while relocating valid data from one block to another block, and/or while calculating parity data in the NVMe mode (e.g. based on a mismatch between the L2P updates and the L2P table or in some other manner).

After determining that a shutdown resulting in unfinished work in the NVMe mode has occurred, the controller may determine whether the amount of the unfinished work (e.g. a total time for completing the unfinished work) exceeds the initialization time in the SD mode. For example, if the unfinished work includes scanning blocks for L2P consolidation, then the controller may determine a number of word lines to be scanned in each block and estimate the total time to complete scanning the blocks based on an average amount of time to read each word line. Alternatively, the controller may estimate the completion time for unfinished work in other ways.

If the controller determines that the total time to complete the unfinished work exceeds the initialization time (e.g. the total unfinished work is estimated to take longer than 1 second in SD), the controller may segregate or mark the unfinished work into different portions including mandatory work and non-mandatory work. As used herein, the term "mandatory work" is intended to mean unfinished work that the controller may perform during initialization of the storage device to prevent functionality failures. For example, the controller may categorize block scanning for L2P consolidation and L2P consolidation as mandatory work, since execution of certain host commands may fail if previous L2P updates are not scanned and consolidated into the L2P table. Moreover, as used herein, the term "non-mandatory work" is intended to mean unfinished work that may not lead to functionality failures if the work is not performed during initialization. For example, the controller may categorize data relocation from a source block to a target block as non-mandatory work, since postponing performance of such work may still allow host commands to successfully process since the data is not missing (e.g. the data is in the source block). In another example, the controller may categorize parity data calculation as non-mandatory work, since the parity data may be delayed in use until after processing a host command for reading data and detecting an error in the read data.

To avoid multi-protocol device timeouts, the controller may perform the mandatory work during initialization in the SD mode within the available initialization time, and the controller may perform the non-mandatory work during execution of the first and subsequent host commands in the SD mode after initialization. For instance, if the unfinished work includes L2P table consolidation, data relocation, and parity data calculation, the controller may mark the L2P table consolidation as mandatory work to perform in the foreground during initialization, and the data relocation and parity data calculation as non-mandatory work to perform in the background while executing other host commands after initialization. The controller may perform the mandatory work after power up and during initialization of the storage device following a shutdown (e.g. a UGSD or a GSD) and a mode switch (e.g. from NVMe mode to SD mode) before the controller executes any host commands, or in some cases, the controller may alternatively perform at least a portion of the mandatory work after initialization (e.g. if the mandatory work itself may cause an initialization timeout). In contrast, the controller may postpone performance of the non-mandatory work until after initialization, e.g., during execution of one or more host commands, or in some cases, the controller may perform the non-mandatory work during initialization after the mandatory work is completed. The controller may perform the non-mandatory work after power up following a shutdown (e.g. a UGSD or a GSD), a mode switch (e.g. from NVMe mode to SD mode), and initialization. For example, the controller may perform the non-mandatory work while processing one or more host commands in one mode (e.g. in the SD mode), when such work becomes urgent (e.g. a low block capacity), or after the controller switches to another mode (e.g. to the NVMe mode).

While the controller may refrain from performing non-mandatory work during initialization since such work may not lead to functionality failures as described above, postponing non-mandatory work may cause the storage device to enter an undesired zone over time, such as low block capacity. For example, waiting too long to perform data relocation in various blocks (e.g. after multiple UGSDs and mode switches) may delay the controller in erasing such blocks for subsequent re-use, thereby reducing the number of available blocks in the storage device and limiting block capacity. To ease system handling in the event of such multiple UGSDs and mode switches, the controller may perform the non-mandatory work in a fast-paced manner such that the work is completed during execution of the first one or few host commands, while within the timeout latencies of these individual host commands.

Moreover, the controller may segregate or mark the non-mandatory work into different portions, including one sub-portion to be performed during execution of the host commands in the SD mode, and another sub-portion to be performed in response to determining an urgent block condition or after the controller switches back to the NVMe mode. For example, if the total amount of non-mandatory work is too large to process within the first few host commands or causes host command timeouts, the controller may divide the non-mandatory work such that one portion is performed during the host command(s), while another portion is performed after processing the host command(s) (e.g. after another mode switch). For instance, after initializing in the SD mode, the controller may determine or estimate the time to perform non-mandatory work (e.g. data relocation and parity data calculation) while processing a host command. If this time exceeds a timeout threshold for the host command, the controller may select to perform one portion of the work (e.g. data relocation) while processing the host command to avoid host command timeout and prevent low block capacity, and select to postpone performing another portion of the work (e.g. parity data calculation) until after another mode switch back to the NVMe mode.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
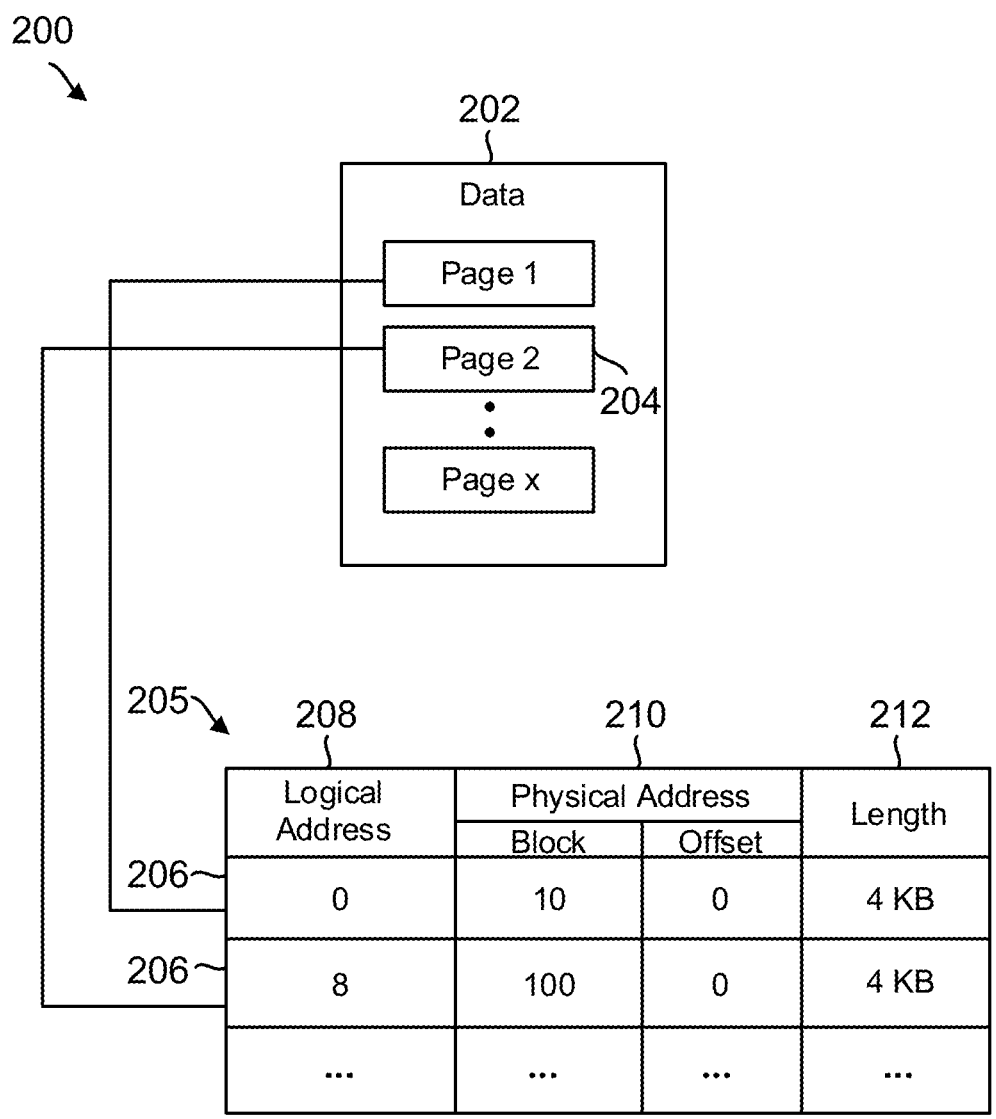
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122.

When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
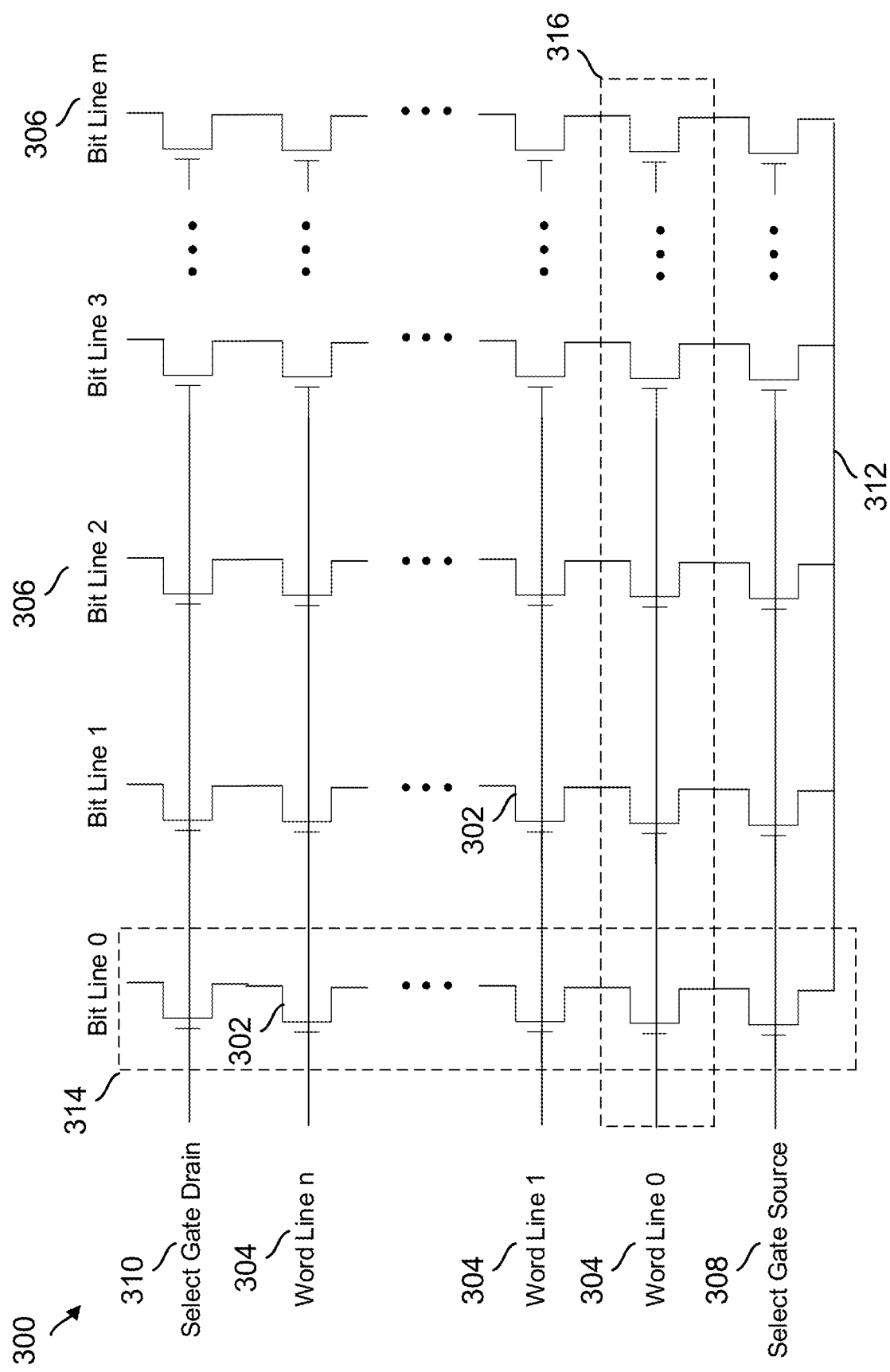
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
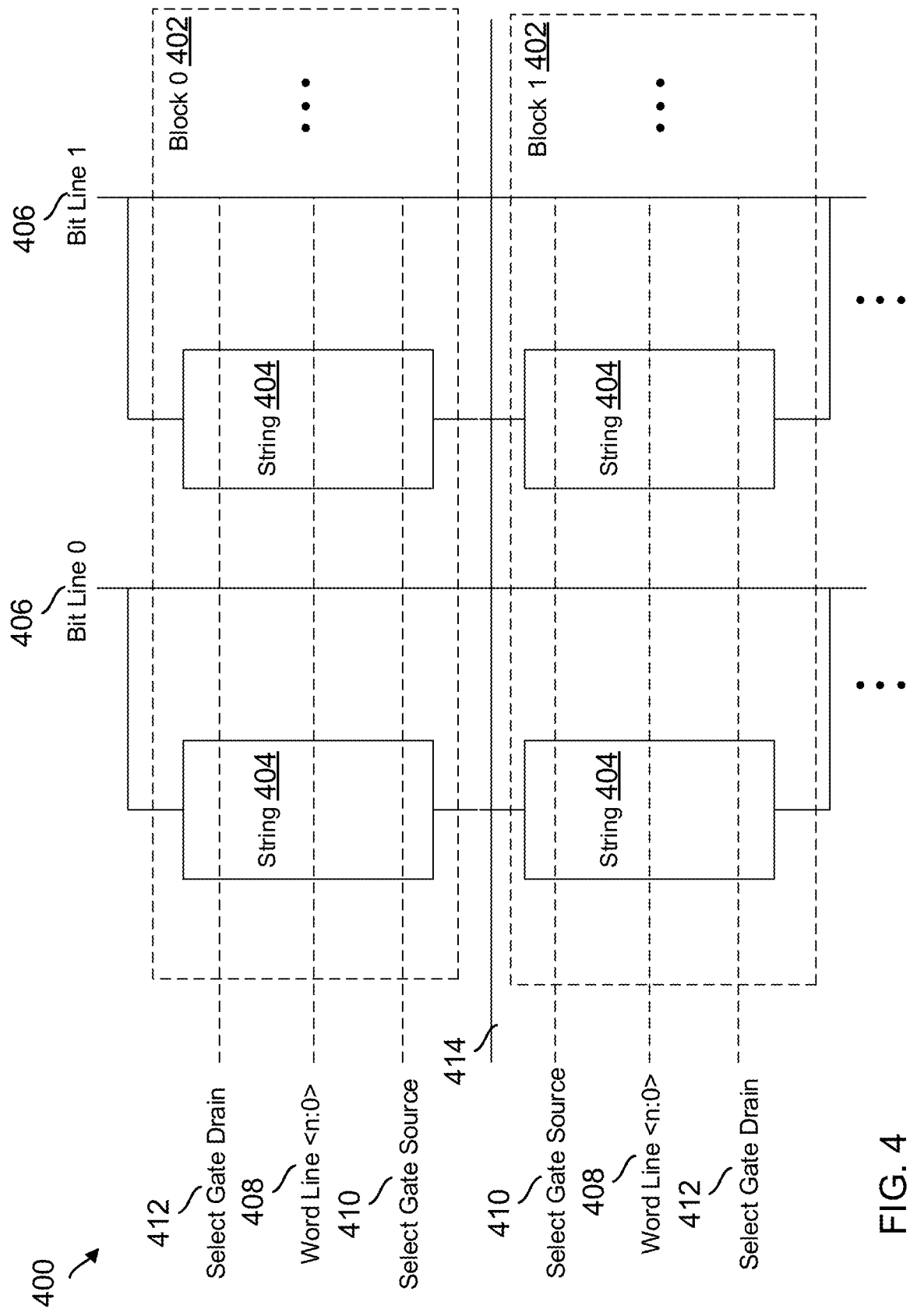
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

Figure 5:
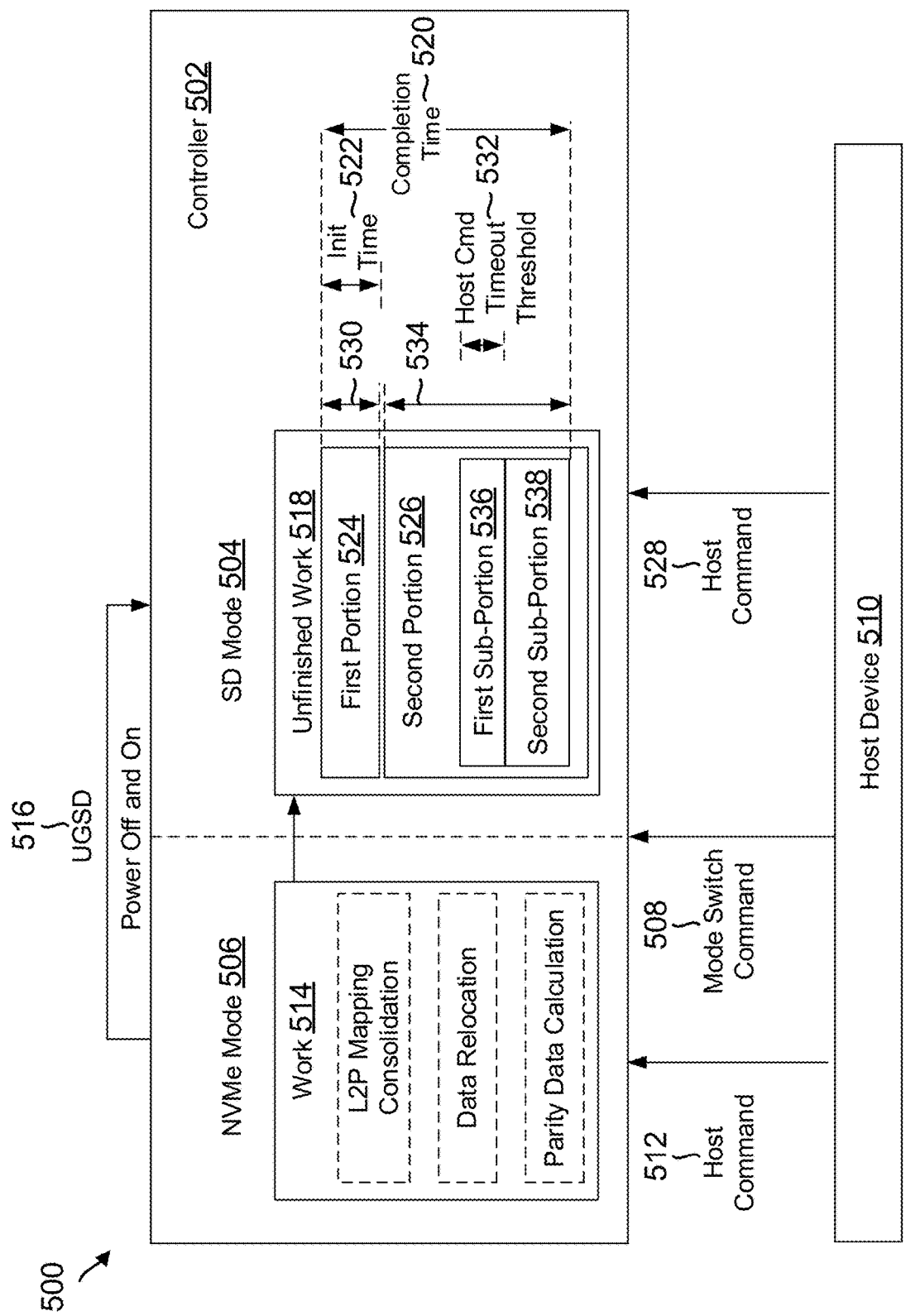
FIG. 5 is a conceptual diagram illustrating an example of a controller of the storage device of FIG. 1 including unfinished work following a shutdown and mode switch.

FIG. 5 illustrates an example diagram 500 of a controller 502 of a multi-protocol storage device that may switch between a first mode 504 (e.g. an SD mode) and a second mode 506 (e.g. an NVMe mode) in response to a mode switch command 508 from a host device 510. For example, controller 502 may correspond to controller 123 of the storage device 102 in FIG. 1, and host device 510 may correspond to host 104 in FIG. 1. When the controller 502 operates in the NVMe mode 506 and is not currently executing a host command 512, the controller may be ready to perform, or may be in the process of performing, work 514. For example, the controller may be in the process of consolidating the L2P mapping table 120, 205, relocating data 119 from one block 402 to another block 402, and/or calculating or building parity data for different pages 316.

However, in the event of a power off or shutdown before the controller completes the work 514 in the NVMe mode 506, such as an UGSD 516, the controller may power on and initialize in the SD mode 504. For instance, after the controller powers back on, the controller may receive a mode switch command 508 from the host device 510 during initialization to switch to the SD mode 504. During initialization in the SD mode, the controller may determine that unfinished work 518 exists (e.g. work 514 that had not been completed during the last power cycle). For example, as part of a journaling process during initialization, the controller may scan a log (e.g. stored in open blocks in NVM) of unconsolidated L2P mapping updates (e.g. L2P entries 206 that were updated and stored in the volatile memory 118 in response to a host command or relocation operation, but not flushed to the NVM 110 for storage in the L2P mapping table 120, 205). If the controller identifies a mismatch between the L2P updates in the open blocks and the L2P entries in the L2P mapping table, the controller may determine that L2P consolidation was interrupted in the NVMe mode due to the UGSD 516, and thus that unfinished work 518 (e.g. the L2P consolidation) exists. The controller may similarly determine if a data relocation was interrupted in the NVMe mode (e.g. as identified based on an L2P mismatch), and/or if the building of parity data associated with the relocated data was interrupted in the NVMe mode (e.g. if XOR results of the data were updated and stored in the volatile memory 118 in response to a host command or relocation operation but similarly not flushed to the NVM 110). The controller 502 may alternatively determine if work 514 was incomplete or if unfinished work 518 exists in other ways.

Due to the large memories and complex firmware operations in NVMe, the unfinished work 518 following a mode switch to the SD mode 504 may involve, e.g., the controller 502 scanning a large number of open blocks, consolidating a large number of L2P updates, and/or building and flushing a large number of XOR results for parity data in order to complete the work 514 that was to be performed in the NVMe mode 506. However, since the SD mode 504 includes much smaller initialization timeouts, the controller may be unable to fully perform the unfinished work 518 in the SD mode during initialization. Therefore, if the controller 502 determines during initialization that unfinished work 518 exists in the SD mode 504 from work 514 not fully performed in the NVMe mode 506, which the controller may ascertain based on the mode switch command 508 and based on L2P mismatches or other factors as described above, the controller may next determine whether the amount of time to complete the unfinished work 518 (e.g. the completion time 520) exceeds the maximum amount of time available to initialize in the SD mode before an initialization timeout (e.g. the initialization time 522). If the completion time 520 falls within the initialization time 522 (e.g. there is a small amount of unfinished work 518), the controller may perform the entire amount of unfinished work during initialization.

On the other hand, if the completion time 520 exceeds the initialization time 522 (e.g. there is a large amount of unfinished work 518), the controller 502 may segregate the unfinished work 518 into different portions. For example, the controller may divide the unfinished work 518 into a first portion 524 that the controller performs during the initialization, and a second portion 526 that the controller may postpone to perform after initialization. For instance, the first portion 524 may correspond to mandatory work as described above that the controller may perform during initialization, and the second portion 526 may correspond to non-mandatory work as described above that the controller may perform while executing a host command 528, after detecting an urgent condition of the storage device (e.g. a low number of available blocks 402), or after the controller switches again to the NVMe mode 506 (e.g. in response to another mode switch command 508 from the host device 510).

As illustrated in FIG. 5, the controller 502 may divide the unfinished work 518 such that the first portion 524 or mandatory work may be completed within a time 530 that does not exceed the initialization time 522. For example, the controller may determine the time 530 to complete mandatory work, divide the unfinished work 518 into portions 524, 526 based on the time 530, and complete the mandatory work before proceeding to perform the non-mandatory work after initialization. If the mandatory work is completed before the initialization time 522 has expired, the controller may perform part of the non-mandatory work (e.g. in second portion 526) also during initialization. Thus, initialization timeouts in the SD mode 504 from completing large amounts of unfinished work 518 at once may be avoided.

Also as illustrated in FIG. 5, the controller 502 may divide the unfinished work 518 such that the second portion 526 may be completed within a timeout threshold 532 for one or more host commands 528. For example, the controller may determine a time 534 to complete the non-mandatory work, and if the time 534 does not exceed the timeout threshold 532 for one or more initial host commands 528 (e.g. performing the work while executing the host command may not result in a timeout), the controller may perform the non-mandatory work while executing the host command(s) 528. If the time 534 does exceed the timeout threshold 532 for a host command (e.g. the second portion is too large to complete while executing one or more initial host commands), the controller may further sub-divide the second portion 526 into sub-portions such that at least one sub-portion may be completed within the timeout threshold 532 for the host command(s), and such that at least another sub-portion may be postponed until after completing the host command(s) (e.g. until an urgent condition or another mode switch). For example, the controller may divide the second portion 526 into a first sub-portion 536 that the controller may perform during execution of host command (s) 528 (without exceeding the host command timeout threshold 532 for each host command), and a second sub-portion 538 that the controller may postpone until an urgent condition of the storage device or until after the controller switches back to the NVMe mode 506. Thus, host command timeouts due to concurrent background processing of non-mandatory work may also be avoided.

Various examples of how the controller 502 may divide the unfinished work 518 following a UGSD 516 and a mode switch to the SD mode 504 are hereafter described.

In one example, if the UGSD 516 occurred in response to a write abort in the NVMe mode 506 (e.g. a power interrupt while programming one of the blocks 402 in response to a host write command), the unfinished work 518 may include relocating data from the write aborted block to another block 402. Although the controller may mark this work as non-mandatory work (e.g. as part of the second portion 526), the controller may nevertheless perform this work during initialization in the SD mode 504 with the mandatory work if the time to complete the data relocation is short (e.g. if the block 402 includes few programmed word lines 304, 408), since an initialization timeout may not occur. However, if the time to complete the data relocation is long (e.g. if the block 402 includes many programmed word lines), the controller may postpone this work to be performed after initialization in the SD mode 504 as described above.

In another example, if the UGSD 516 occurred in the NVMe mode 506 without a write abort situation (e.g. during a master table dump), the unfinished work may include L2P consolidation (e.g. replaying and building the L2P mapping table 120, 205). The controller may mark this work as mandatory work (e.g. as part of the first portion 524), and perform this work during initialization in the SD mode 504. By performing this work during initialization, the controller may prevent subsequent L2P data mismatches that may interfere with successfully processing subsequent host commands.

In a further example, if the UGSD 516 occurred in the NVMe mode 506 without a write abort situation (e.g. during a master table dump), the unfinished work may again include L2P consolidation (e.g. replaying and building the L2P mapping table 120, 205). However, if the time to complete L2P consolidation is long (e.g. a number of L2P entries to be consolidated exceeds a threshold), then unlike the previous example, the controller may mark this work as non-mandatory work (e.g. as part of the second portion 526) and postpone performance of this work until after initialization in the SD mode 504. For example, the L2P updates may be flushed to the NVM 110 if the number of L2P entries 206 to be updated is more than a L2P flushing threshold in the SD mode 504. As a result, if the controller considers this work as mandatory work and thus restarts the L2P consolidation in the SD mode during initialization, the time to complete the unfinished work including the flushing may likely exceed the initialization time 522, resulting in a timeout. To address this timeout risk, the controller may instead mark this work as non-mandatory work to be postponed until after initialization in the SD mode 504. For example, the controller may increase the L2P flushing threshold to allow more L2P updates to be created before flushing, thereby delaying the flushing of L2P updates until after initialization. As a result, the controller may perform the L2P consolidation while executing one or more host commands. The controller may reset the L2P flushing threshold afterwards.

In another example, if the UGSD 516 occurred in the NVMe mode 506, the unfinished work 518 may include parity data (XOR result) rebuilding or calculation in response to replayed data (e.g. for L2P consolidation or data relocation). The controller may mark this work as non-mandatory work (e.g. as part of the second portion 526) and perform this work after initialization in the SD mode 504. In contrast to more urgent work such as L2P consolidation, the controller may delay parity data building (e.g. as part of the first sub-portion 536 of the second portion 526) since the updated parity data may be delayed in use until after the controller receives a read command from the host device 510 for data 119 and detects an error or failure in reading the data 119.

In an additional example, if the UGSD 516 occurred in response to a write abort in the NVMe mode 506 (e.g. during a relocation stream of data from a source block to a target block), the controller may mark this work as non-mandatory work (e.g. as part of the second portion 526) and perform this work after initialization in the SD mode 504. In contrast to more urgent work such as L2P consolidation, the controller may delay data relocation (e.g. as part of the second sub-portion 538 of the second portion 526) since a copy of the data is available in the source block and thus this work may have less urgency to complete. For instance, such work may be delayed until after another power cycle or mode switch back to the NVMe mode 506.

While the above examples refer to specific instances of unfinished work 518 including block scanning, L2P consolidation, data relocation and parity data calculation, the controller 502 may segregate other unfinished work into mandatory and non-mandatory work to be performed or postponed accordingly (following a UGSD 516 and a mode switch to the SD mode 504). For instance, other examples of work such as power failure handling, read scrub and relinking may be similarly marked by the controller 502 as less urgent non-mandatory work (e.g. as part of the second sub-portion 538 of the second portion 526) and postponed after initialization in the SD mode 504 until another power cycle or mode switch to the NVMe mode 506. Alternatively, the controller may perform non-mandatory work during the initialization in the SD mode 504 if the work may be performed without exceeding the initialization time 522.

The controller 502 may also delay performing unfinished work 518 for certain blocks until the controller switches to the NVMe mode 506. As described above, the NVMe mode may have more flexible timeout considerations than the SD mode, and therefore the controller 502 may postpone at least a portion of unfinished work 518 associated with these blocks until after a mode switch to the NVMe mode 506. Thus, the controller may refrain from performing such work during the SD mode 504. For example, the controller may use more blocks 402 in the NVMe mode than in the SD mode (e.g. for cleaner data segregation). Therefore, if the unfinished work 518 is associated with certain open blocks that are used in the NVMe mode 506 but that are not used in the SD mode 504, the controller may postpone performing the unfinished work for these unused blocks during the SD mode. For instance, if the unfinished work 518 includes performing data relocation from these blocks, and/or calculating parity data (XOR results) for these blocks following a UGSD 516, the controller may postpone performing the work for these blocks. As an example, if the controller 502 determines that a block may not be used in the SD mode 504 (e.g. based on a comparison of its logical address to a list of logical addresses used in the NVMe mode), the controller 502 may mark the unfinished work associated with that block as non-mandatory work (e.g. as part of the second sub-portion 538 of second portion 526) and delay performing this work until after a mode switch back to the NVMe mode 506.

Furthermore, when the controller 502 performs unfinished work 518 while in the SD mode 504 (e.g. as part of first sub-portion 536 of second portion 526), the controller may perform the unfinished work across multiple host commands 528 or across sectors within a host command 528. For example, the controller may perform the first sub-portion 536 of the work during execution of multiple read or write commands, or while processing operations associated with different logical addresses in a single read or write command. In such case, the controller may perform the first sub-portion 536 of the work during a respective host command without exceeding the respective host command timeout threshold 532 (e.g. 100 ms per sector for reads and 250 ms per sector for writes). If the controller determines that unfinished work (e.g. first sub portion 536) may exceed the timeout threshold for a host command, the controller may further divide and postpone the work accordingly. For instance, the controller may decide to perform non-mandatory work (e.g. the second portion 526) in different phases or portions based on host speed, firmware state machine and other system factors.

Figure 6:
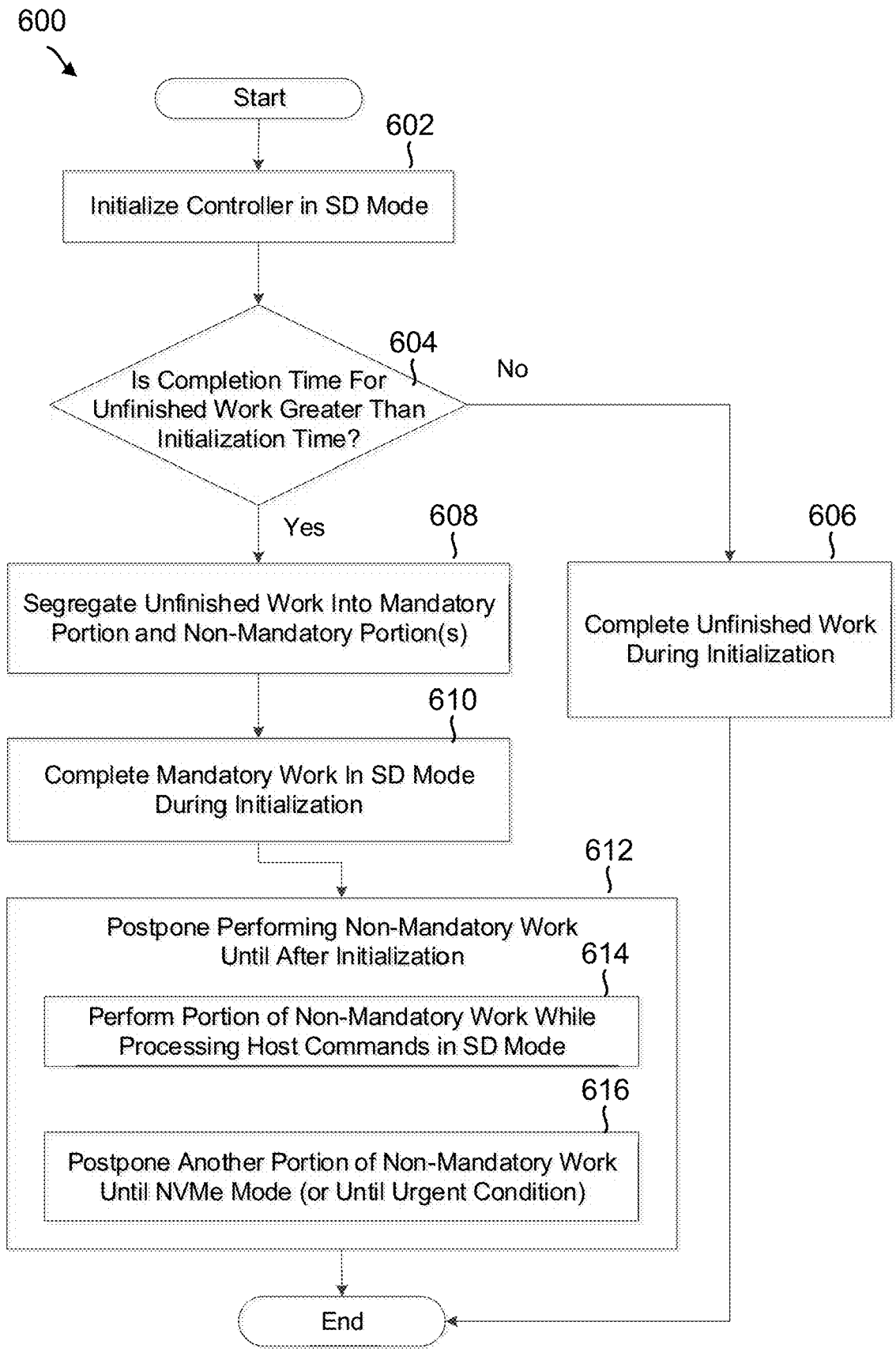
FIG. 6 is a flow chart illustrating a method for completing unfinished work after a multi-protocol mode switch, as performed by the storage device of FIG. 1.

FIG. 6 illustrates an example flow chart 600 of a method for completing unfinished work after a mode switch (e.g. from a NVMe mode to an SD mode) in a multi-protocol storage device. For example, the method can be carried out in a storage device 102 such as the one illustrated in FIG. 1. Each of the steps in the flow chart can be controlled using the controller as described below (e.g. controller 123, 502), or by some other suitable means.

As represented by block 602, the controller may initialize in a first mode (e.g. the SD mode) in response to a shutdown and power on of the storage device. The shutdown may comprise a UGSD. The shutdown may also result in unfinished work left over from a second mode (e.g. a NVMe mode). For example, referring to FIG. 5, the controller 502 may initialize in the SD mode 504 (e.g. based on a mode switch command 508 received from the host device 510) after a UGSD 516 during the NVMe mode 506 that results in unfinished work 518.

As represented by block 604, the controller may determine whether the completion time for unfinished work is greater than the initialization time. For instance, the controller may determine whether the device experienced a complex exit, e.g. a shutdown that resulted in a total amount of unfinished work greater than the available time to initialize the storage device. For example, referring to FIG. 5, the controller 502 may determine whether the completion time 520 for the unfinished work 518 exceeds the initialization time 522. If the controller determines that the completion time for the unfinished work is not greater than the initialization time (e.g. performing all the unfinished work during initialization will not result in an initialization timeout), then as represented by block 606, the controller may complete the unfinished work during initialization.

Otherwise, if the completion time exceeds the initialization time, then as represented by block 608, the controller may segregate the unfinished work into a first portion (e.g. mandatory work) and at least a second portion (e.g. non-mandatory work) that may be performed with respect to a host command. For example, referring to FIG. 5, the controller 502 may divide the unfinished work 518 into a first portion 524 corresponding to mandatory work, and a second portion 526 corresponding to non-mandatory work. In another example, the first portion 524 may include mandatory and non-mandatory work, and the second portion 526 may include mandatory and non-mandatory work. In a further example, the controller may sub-divide the second portion 526 into sub-portions as previously described.

Next, as represented by block 610, the controller may complete the mandatory work during initialization in the SD mode. The mandatory work may include a first portion of the unfinished work (e.g. work left over from the NVMe mode) that, when performed, does not exceed an initialization time for the SD mode. For example, referring to FIG. 5, the controller 502 may perform the first portion 524 of the unfinished work 518 during initialization in response to determining that a time 530 for completing the first portion 524 does not exceed the initialization time 522.

Furthermore, as represented by block 612, the controller may postpone performing the non-mandatory work until after initialization. The controller may mark the non-mandatory work (e.g. identify a second portion of the unfinished work left over from the NVMe mode) to be postponed in its performance until after initialization in the SD mode. For instance, as represented by block 614, the controller may perform a portion of the non-mandatory work while processing one or more host commands in the SD mode. For example, referring to FIG. 5, the controller 502 may perform the second portion 526 of the unfinished work 518 while executing a host command 528. The controller may perform the non-mandatory work such that it does not result in a timeout during execution of a host command. For example, referring to FIG. 5, the controller 502 may perform the second portion 526 of the unfinished work 518 while executing the host command 528 in response to determining that a time 534 for completing the second portion does not exceed a timeout threshold 532 for the host command 528.

Finally, as represented by block 616, the controller may postpone another portion of the non-mandatory work until the controller switches to the NVMe mode or until an urgent condition (e.g. low block capacity) arises. In one example, referring to FIG. 5, the controller 502 may switch from the SD mode 504 to the NVMe mode 506 after performing the first portion 524 of the unfinished work 518 (e.g. the mandatory work), and the controller may perform the second portion 526 of the unfinished work after switching to the NVMe mode 506. In another example, also referring to FIG. 5, the controller 502 may segregate the second portion 526 of the unfinished work 518 (e.g. the non-mandatory work) into a first sub-portion 536 and a second sub-portion 538, and the controller may perform the first sub-portion 536 while executing a host command 528 and the second sub-portion 538 after executing the host command 528. For instance, the controller may postpone performance of the second sub-portion 538 until after switching to the NVMe mode 506.

Accordingly, the multi-protocol storage device described in the present disclosure may provide phased initialization to avoid host timeouts, especially during mode switches from an NVMe mode to an SD mode. When such device experiences a power interrupt causing a shutdown in one mode (e.g. the NVMe mode), resulting in a large amount of unfinished work to be completed upon initialization in a different mode (e.g. the SD mode after a mode switch), the device may avoid initialization timeouts in the different mode by segregating the unfinished work into different portions to be performed at different times. Thus, mandatory work such as L2P consolidation may be performed during initialization, while non-mandatory work such as data relocation or parity data calculation may be postponed until after initialization to allow for processing of subsequent host commands. Moreover, when large amounts of non-mandatory work exist, additionally postponing non-mandatory work (with respect to other non-mandatory work) until another mode switch occurs may help to avoid host command timeouts. As a result, performance of multi-protocol storage devices may be improved.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a controller configured to initialize in a first mode after a shutdown during a second mode resulting in unfinished work, the unfinished work having a completion time exceeding an initialization time, to perform a first portion of the unfinished work during initialization, and to postpone performance of a second portion of the unfinished work until after the initialization.

2. The storage device of claim 1, wherein the shutdown comprises an ungraceful shutdown (UGSD).

3. The storage device of claim 1, wherein the first mode comprises a Secure Digital (SD) mode, and wherein the second mode comprises a non-volatile memory express (NVMe) mode.

4. The storage device of claim 1, wherein the controller is further configured to perform the first portion of the unfinished work during the initialization in response to determining that a time for completing the first portion does not exceed the initialization time.

5. The storage device of claim 1, wherein the controller is configured to perform the second portion of the unfinished work while executing a host command.

6. The storage device of claim 5, wherein the controller is further configured to perform the second portion of the unfinished work while executing the host command in response to determining that a time for completing the second portion does not exceed a timeout threshold for the host command.

7. The storage device of claim 1, wherein the controller is configured to switch from the first mode to the second mode after performing the first portion of the unfinished work, and to perform the second portion of the unfinished work after the switch to the second mode.

8. The storage device of claim 1, wherein the second portion of the unfinished work comprises a first sub-portion and a second sub-portion, wherein the controller is configured to perform the first sub-portion while executing a host command and to perform the second sub-portion after executing the host command.

9. The storage device of claim 8, wherein the controller is configured to switch from the first mode to the second mode after performing the first portion of the unfinished work, and to postpone performance of the second sub-portion until after the switch to the second mode.

10. A storage device, comprising:
a controller configured to initialize in a first mode in response to a shutdown during a second mode, to determine whether a completion time for unfinished work prior to the shutdown exceeds an initialization time, and to perform a first portion of the unfinished work during initialization and to perform at least a second portion of the unfinished work after the initialization when the completion time exceeds the initialization time.

11. The storage device of claim 10, wherein the controller is configured to perform the first portion of the unfinished work during the initialization in response to determining that a time for completing the first portion is within the initialization time.

12. The storage device of claim 10, wherein the controller is further configured to perform the at least the second portion of the unfinished work during execution of a host command.

13. The storage device of claim 12, wherein the controller is configured to perform the at least the second portion of the unfinished work during the execution of the host command when a time for completing the at least the second portion does not exceed a timeout threshold for the host command.

14. The storage device of claim 10, wherein the controller is configured to switch from the first mode to the second mode after performing the first portion of the unfinished work.

15. The storage device of claim 14, wherein the at least the second portion of the unfinished work comprises a first sub-portion and a second sub-portion, wherein the controller is configured to perform the first sub-portion during execution of a host command in the first mode prior to switching from the first mode to the second mode, and wherein the controller is configured to perform the second sub-portion after switching to the second mode.

16. A storage device, comprising:
a controller configured to initialize in a first mode after a shutdown during a second mode, to determine whether a completion time for unfinished work prior to the shutdown exceeds an initialization time, and to postpone performance of a portion of the unfinished work until after initialization when the completion time exceeds the initialization time.

17. The storage device of claim 16, wherein the controller is further configured to perform another portion of the unfinished work during the initialization in the first mode when a time for completing the another portion does not exceed the initialization time.

18. The storage device of claim 16, wherein the controller is further configured to perform the portion of the unfinished work during execution of a host command in the first mode in response to determining that a time for completing the portion does not exceed a timeout threshold for the host command.

19. The storage device of claim 16, wherein the controller is configured to switch from the first mode to the second mode after the initialization, and to perform the portion of the unfinished work after the switch.

20. The storage device of claim 16, wherein the portion of the unfinished work comprises a first sub-portion and a second sub-portion, wherein the controller is configured to perform the first sub-portion during execution of a host command, and wherein the controller is configured to postpone the performance of the second sub-portion until after the execution of the host command.

* * * * *